(12) United States Patent
Biernatek

(10) Patent No.: US 10,912,417 B2
(45) Date of Patent: Feb. 9, 2021

(54) GRINDER ASSEMBLY

(71) Applicant: Kinu Grinders LLC, Coral Gables, FL (US)

(72) Inventor: Eduard Biernatek, Rodgau (DE)

(73) Assignee: KINU GRINDERS LLC, Coral Gables, FL (US)

( * ) Notice: Subject to any disclaimer, the term of this patent is extended or adjusted under 35 U.S.C. 154(b) by 387 days.

(21) Appl. No.: 15/681,101

(22) Filed: Aug. 18, 2017

(65) Prior Publication Data

US 2018/0049591 A1 Feb. 22, 2018

(30) Foreign Application Priority Data

Aug. 19, 2016 (DE) .............................. 201620104557

(51) Int. Cl.
*A47J 42/06* (2006.01)
*A47J 42/04* (2006.01)
*A47J 42/10* (2006.01)

(52) U.S. Cl.
CPC ............... *A47J 42/06* (2013.01); *A47J 42/04* (2013.01); *A47J 42/10* (2013.01)

(58) Field of Classification Search
CPC ............. A47J 42/06; A47J 42/04; A47J 42/10
See application file for complete search history.

(56) References Cited

U.S. PATENT DOCUMENTS

| | | | |
|---|---|---|---|
| 419,701 A | 1/1890 | McCLain | |
| 2,688,448 A | 9/1954 | Lenz | |
| 3,233,835 A * | 2/1966 | Sevin | B01F 9/18 241/72 |
| 3,840,190 A * | 10/1974 | Consoli | B02C 4/04 241/117 |
| 4,504,020 A * | 3/1985 | Nishida | B02C 17/02 241/121 |
| 5,709,345 A * | 1/1998 | Yamamoto | F26B 3/205 241/17 |
| 6,764,034 B2 * | 7/2004 | Kelsey | B02C 17/002 241/30 |
| 6,948,672 B2 | 9/2005 | Herren | |
| 6,966,507 B2 | 11/2005 | Yang | |
| 7,007,875 B2 * | 3/2006 | Cheng | A47J 42/06 241/169.1 |
| D575,099 S | 8/2008 | Jalet | |
| 7,878,437 B2 * | 2/2011 | Rice | A47J 42/08 241/189.1 |
| 8,235,317 B2 | 8/2012 | Wilson et al. | |
| 9,066,629 B1 | 6/2015 | Melvin | |
| 2005/0029376 A1 | 2/2005 | Heng et al. | |

(Continued)

*Primary Examiner* — Faye Francis
(74) *Attorney, Agent, or Firm* — Malloy & Malloy, PL; Jennie S. Malloy

(57) ABSTRACT

A grinder assembly which minimizes deviations in the path of ground material as well as other interfering structure is provided. A receiving chamber is disposed above a grinding mechanism and provides for direct transfer of material to be ground from the outlet aperture of the receiving chamber to the grinding mechanism. The grinding mechanism is driven from above and, therefore, no other structure necessary which may interfere with the ejection of grounds from the grinder assembly. A vacuum-stabilized base plate may also be provided in order to securely and removably mount the grinder assembly to a surface.

9 Claims, 6 Drawing Sheets

(56) References Cited

U.S. PATENT DOCUMENTS

| | | | |
|---|---|---|---|
| 2005/0035233 A1* | 2/2005 | Fredericks | A47J 42/06 241/169.1 |
| 2013/0153698 A1 | 6/2013 | Zhang | |
| 2013/0327867 A1 | 12/2013 | Palmer | |
| 2019/0104886 A1* | 4/2019 | Buening | A47J 42/06 |

* cited by examiner

GRINDER ASSEMBLY

CLAIM OF PRIORITY

A claim of priority pursuant to 35 U.S.C. § 119 is hereby made to an application for utility model filed in Germany, namely, that having application number DE201620104557, filed on Aug. 19, 2016, and which matured into granted utility model number DE 20 2016 104 557.

BACKGROUND OF THE INVENTION

Field of the Invention

The invention relates to a grinder assembly which seeks to minimize the amount of ground material left within the grinder assembly after a grinding operation is performed.

Description of the Related Art

Grinders generally, as well as coffee grinders more specifically, include a grinding mechanism with a fixed portion and a moveable portion, for example a grinding ring and a grinding cone arranged within the grinding ring, which is rotated against the grinding ring. In certain models, an electrical drive system, is arranged on the outlet side of the grinding mechanism, so that the ground coffee must be diverted past the drive system. Often, the coffee grounds are ejected laterally in these coffee grinders, i.e., perpendicularly to the axis of rotation of the grinding mechanism. This arrangement is disadvantageous in that residual quantities of grounds remain in the transport channels and other required transport structures. It can be difficult to thoroughly remove grounds such that they remain in the transport channels of the coffee grinder, until they are ejected with at least the initial portion of freshly grounds the next time the grinder is used.

In the context of a coffee grinder, when old coffee grounds mix with the freshly ground coffee, it can spoil the quality of the coffee, especially if the old grounds are stale or are of a different grind size. This spoilage can be avoided if a cleaning process is implemented whereby the initial portion of grounds are disposed. However, this is an expensive and inefficient solution, due to the wasted coffee.

Therefore, there is a need in the art for a grinder, and particularly a coffee grinder, which is designed in a compact manner and which allows for a grinding process in which almost no ground material remains in the grinder after the grinding process.

SUMMARY OF THE INVENTION

The present invention presents an inventive solution to the foregoing needs, as well as others, by minimizing the transport structures required to carry coffee beans and other material to be ground into the grinding mechanism, as well as minimizing the transport structures required to eject grounds from the grinder. In one embodiment of the present invention, the drive system which drives the grinding mechanism is disposed in non-interfering relation to the coffee beans as they are transported from a receiving chamber into the grinding mechanism, and is also disposed in non-interfering relation to the grounds as they are ejected from the grinding mechanism.

In yet another embodiment, a receiving chamber is disposed above a grinding mechanism, the receiving chamber including at least an outlet aperture disposed above the grinding mechanism. No other structure is disposed between the outlet aperture and the grinding mechanism. In such an embodiment, the grinding mechanism may be driven by a centrally or axially located shaft, which, due to its axial disposition, does not interfere with coffee beans travelling toward the grinding mechanism.

Additionally, because the grinding mechanism is driven from above, the outlet end is clear of further structure which may otherwise interfere with grounds being ejected from the grinder assembly. Thus, the need to eject the grounds laterally, or otherwise divert the grounds from a substantially downward trajectory is avoided.

In yet further embodiments, the present invention is a grinder assembly that includes a grinding mechanism stator that is connected in non-moving or non-rotating relation to a housing of the grinder assembly. A grinding mechanism rotor is connected in non-moving or non-rotating relation to a sleeve, the sleeve being rotationally mounted within the housing. The grinder assembly also comprises a receiving chamber and a filling aperture for the coffee beans to be ground, as well as an outlet aperture facing the grinding mechanism.

Advantageously, the present invention also includes a discharge conduit for the coffee comprising a substantially straight form such that diversions and additional transport structures inside the grinder are eliminated. Such a construction is facilitated by the sleeve enclosing the receiving chamber, which rotates during the grinding process, and into which the coffee beans to be ground are filled. While grinding, the coffee beans are thus rotated together with the sleeve.

In at least one embodiment, the grinder assembly also includes a drive system, that impels the sleeve for rotation, and is radially spaced in relation to the rotation axis. Therefore, the drive system is advantageously disposed in non-interfering relation to the discharge conduit, outlet aperture, and outlet end for the coffee and grounds, and is further disposed away from the rotation axis of the rotating components. The housing of grinder assembly accommodates additional installation space for the drive system and accordingly, different types of drive systems may be accommodated. For example, as will be subsequently described in more detail, the drive system can be designed in the form of a manual or electromotive drive system, either of which may not require a transmission.

In one embodiment, the sleeve can be substantially cylindrical in form, however, this is not required. The sleeve can also be designed in a variety of rotationally symmetric forms.

In one preferred embodiment, a shaft is disposed coaxially within the sleeve, the shaft being disposed to rotate with the sleeve and preferably driven by the sleeve. To facilitate the driven relation of the shaft, one or more cross bars may be deployed between the sleeve and the shaft. The shaft is in turn connected in driving relation to the grinding mechanism rotor. In a preferred embodiment, the grinding mechanism rotor is disposed at one end of the shaft, and most preferably at a lower end of the shaft, wherein the shaft is disposed substantially vertically.

During the grinding process, the coffee beans in the sleeve will, eventually, rotate along with the sleeve and together with the at least one cross bar. Therefore, the cross bar has no interfering relation to the coffee passing through the grinder assembly. At the very least, and interference is minimized by the collective rotation of beans along with the cross bar. In a preferred embodiment, the at least one cross bar should be mounted with sufficient spacing relative to the outlet aperture to allow the coffee beans to pass into the grinding mechanism.

In one embodiment, the shaft extends through a passage of the at last one cross bar. In order to facilitate an easy disassembly of the coffee grinder, the shaft can be detached from the cross bar in a non-destructive manner and/or without using tools. This may be accomplished, for example, by forming a non-rotatable mating interface between the shaft and the cross-bar, such as a keyway and corresponding key. Alternatively, the cross-section of the shaft may have an external shape that deviates from a circular form while the cross-section of the opening has a corresponding internal shape.

In yet another embodiment, an adjustment mechanism may be provided to facilitate adjustment of the grinding mechanism. By way of example, the shaft may include a screw thread to receive an adjusting cap which is operative to adjust the axial distance between the grinding mechanism rotor and the grinding mechanism stator.

The grinding mechanism can be designed in the form of a tapered grinding mechanism, including a cone and ring, for example, having a diameter of 68 mm. It will be appreciated that the rotor, driven by the shaft, can comprise the cone, while the stator comprises the ring. However, other configurations are possible, for example, the ring may be disposed to be driven by the sleeve, and in such an embodiment the ring would comprise the rotor.

Especially in view of a compact design, which requires only a few components, in a preferred embodiment, the grinding mechanism and the sleeve are arranged in coaxial configuration to one another. At a minimum, at least the grinding mechanism rotor and the sleeve are arranged in coaxial configuration to one another.

The sleeve can be mounted in rotating relation to the housing via at least one bearing, preferably a ball bearing. Alternatively, it is also possible to use a slide bearing. If desired, a feed funnel for directing the coffee beans into the filling aperture of the sleeve may be provided. For example, the feed funnel can be arranged at the top of housing or alternatively, it may be formed unitarily with the housing.

The grinder also includes a drive system for rotating a sleeve relative to the housing. Due to the advantageous design of the grinder, a number of drive systems can be accommodated. Moreover, due to its compact and efficient design, the present invention also has a particularly low noise level, low vibration, and requires only a few components. For these reasons among others, the inventive coffee grinder can be manufactured in an efficient manner, both in terms of cost and complication of production.

In at least one embodiment, the drive system comprises an electric drive motor. For example, the electric drive motor can be designed in the form of a permanent magnet motor or other appropriate motor such as a brushless motor.

In an especially advantageous embodiment, the electric drive motor comprises a stator, which is disposed within housing about the inner wall thereof and which has multiple stator coils. Furthermore, the electric drive motor can comprise a rotor, which is disposed about the sleeve and may be comprised of a plurality of permanent magnets disposed about the outer wall of the sleeve. Such an arrangement is especially advantageous and can be manufactured in an especially compact manner. Moreover, and important, such an embodiment does not require a transmission.

Alternatively, or in addition to a purely electrically operating drive system, it is also possible to employ a manually operated drive system. For this purpose, the drive system can have, for example, a crank handle connected to either the sleeve or the shaft. An exemplary transmission for the manually operated drive system can include a bevel gear and/or an angle gear.

In one embodiment, the crank handle may be connected directly to the shaft which, when the drive shaft is disposed vertically, dictates a substantially horizontal motion of the crank handle. Depending upon the size of the grinding assembly and the force required, it may be difficult to maintain the grinding assembly in a stable orientation while lateral loads are applied during the horizontal crank motion. Thus, as will be described below, and inventive base plate may be utilized in conjunction with the present invention. Alternatively, however, the crank handle may be disposed in a vertical orientation. In order to accommodate a crank handle disposed in a vertical orientation, gear teeth may be formed around the outer periphery of the sleeve. The drive shaft of the manual drive system may then be disposed in driving relation to the sleeve via a corresponding gear attached to the end of the crank handle.

In view of a compact design and ergonomic handling properties, the rotation axis of the drive shaft can be advantageously arranged perpendicular to the rotation axis of the sleeve. Preferably, the crank handle is mounted on one side of the drive shaft and can be detached in a non-destructive manner and/or without using tools.

In a particularly reliable embodiment, the grinding mechanism is arranged vertically below the receiving chamber, when the coffee grinder is placed on a horizontal surface. Due to the placement of the drive system circumferentially about the sleeve, the non-interfering relation of the drive system relative to coffee beans and coffee grounds is accomplished and the coffee grounds are allowed to pass through the grinder assembly with minimal deviation.

An especially compact embodiment of the present invention is characterized in that the housing has at least partially a spherical shape. In such an embodiment, the upper and lower end have a compact design, which is sufficient for the feed funnel and for mounting the grinding mechanism. The mid-region of the spherical shape then provides sufficient space for installing the drive system, especially an electrical drive system.

It will also be appreciated that the invention is not limited to a coffee grinder. Rather, the above-mentioned characteristics and advantages can also be implemented with respect to a mill or grinder of other materials. It will also be appreciated that the grinder of the present invention may be scaled as desired.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
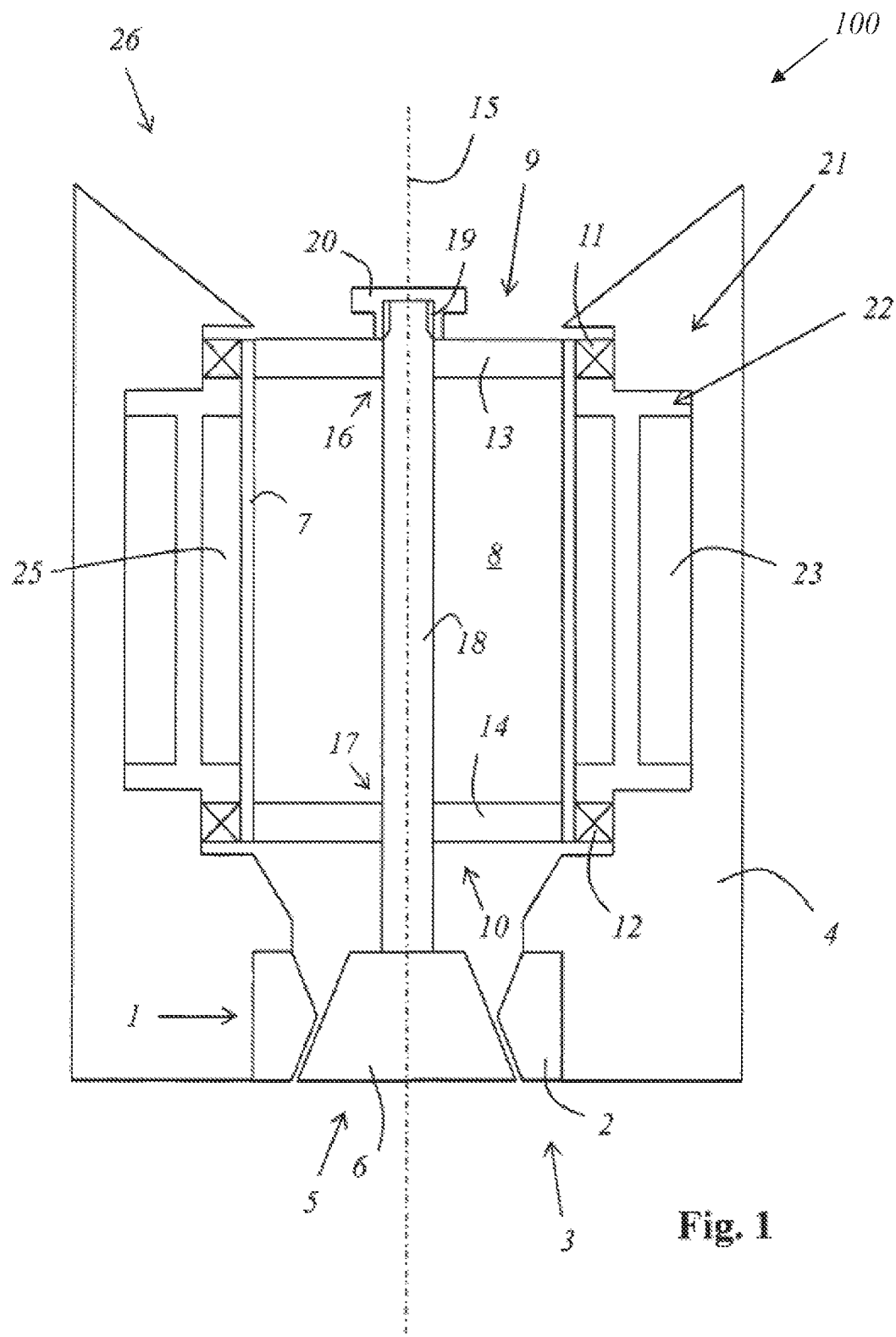
FIG. 1 is a side section view of a grinder assembly in accordance with one embodiment of the present invention.

FIG. 1 shows a first embodiment of an inventive grinder assembly 100, which has a grinding mechanism 1. The grinding mechanism 1 comprises a grinding mechanism stator 3, which in the depicted embodiment is a grinding ring 2, and is connected in non-rotating relation to the housing 4. The grinding mechanism 1 also comprises a grinding mechanism rotor 5, which in the depicted embodiment is a grinding cone 6.

In addition, the grinder assembly 100 includes a sleeve 7, which is mounted in such a way that it can be rotated in relation to the housing 4. The sleeve 7 at least partially defines a receiving chamber 8 for coffee beans to be ground. At its upper end, the sleeve 7 includes a filling aperture 9 for filling coffee beans. At its lower end, the sleeve 7 includes an outlet aperture 10 which facilitates transfer of the coffee beans to the grinding mechanism 1. In a preferred embodiment at least a first rolling bearing 11 disposed at the upper end, as well as a second rolling bearing 12 disposed at the lower end, facilitate the rotation of the sleeve 7 relative to a rotation axis 15 and further in relation to the housing 4.

In the depicted embodiment, the sleeve 7 is designed in the form of a cylinder. However, this is not necessarily required. The sleeve can also be designed a different way, but preferably in a rotationally symmetrical manner.

As may also be seen in FIG. 1, a first cross bar 13 and a second cross bar 14 extend transversely across the sleeve 7. At their ends, the cross bars 13, 14 are connected to the sleeve so as to ensure rotation with the sleeve 7, when the sleeve 7 is rotated. Furthermore, the cross bars 13, 14 are aligned substantially perpendicularly to the rotation axis 15 and extend through the center axis of the sleeve 7. The first cross bar 13 has a centrally located first passage 16. The second cross bar 14 has a centrally located second passage 17. A shaft 18, connected in non-rotating relation to the grinding mechanism rotor 5, is disposed through these passages 16, 17. In a preferred embodiment, the form of the passages 16, 17 and the form of the shaft 18 are designed in such a way that the shaft 18 rotates with the cross bars 13, 14, and not relative thereto. For example, the shaft 18 may be keyed, and engage with correspondingly formed keyways in the passages 16, 17, which affirmatively prevents the shaft from rotating in relation to the cross bars 13, 14 within the passages 16, 17. Alternatively, the shaft 18 may have a cross-section with an external shape that deviates from the circular form, e.g. square or triangular, while the passages have a corresponding internal shape.

On the upper end of the shaft 18 the depicted embodiment includes a screw thread 19. An adjusting cap 20 may be fastened to the screw thread 19. In such an embodiment, it is possible to adjust the axial distance of the grinding mechanism rotor 5 in relation to the grinding mechanism stator 3, thus adjusting fineness or coarseness of the coffee grounds. More specifically, as the adjusting cap 20 is turned onto the screw thread 19, it will pull the shaft up into the interior of the adjusting cap 20, thus raising the grinding mechanism rotor 5 with it.

When the adjusting cap 20 is completely loosened from the shaft 18, the shaft 18, as well as the attached grinding mechanism rotor 5, can be removed in a non-destructive manner and without using tools by pulling the shaft 18 in downward direction, through the first and second passages 16, 17.

The grinder assembly 100 may also comprises a drive system 21, which in the depicted embodiment is electric and which impels the sleeve 7 during a grinding process to rotate in relation to the housing 4. The drive system 21 comprises an electric drive motor 22, preferably a permanent magnet motor.

The electric drive motor 22 includes a stator 23, which comprises multiple stator coils and which is connected in non-rotating relation to the housing 4. Multiple permanent magnets 25 may be arranged symmetrically about the sleeve 7. The rotatable sleeve 7 together with the permanent magnets attached to it form the rotor of the electric drive motor 22. A preferred electric drive motor 22 will be appropriately designed to provide high torque and low speeds, for example, ranging between 200 rpm and 400 rpm.

Accordingly, the grinder assembly 100 shown in FIG. 1 has the advantage of an extremely compact construction, which does not require a transmission. For this reason, the grinder assembly 100 has a low noise level, a low vibration mode, a long service life, and requires fewer components than prior art structures.

The upper end of the housing 4 is designed in the form of a feed funnel 26 to facilitate filling of coffee beans. When the coffee grinder is operating, the coffee beans filled into the sleeve 7 through the filling aperture 9 rotate together with the sleeve 7, the cross bars 13, 14, the shaft 18 and the grinding mechanism rotor 5, all in relation to the housing 4. As the coffee beans at the bottom pass through the outlet aperture 10 to be ground, additional coffee beans are constantly replenished via the mechanism of gravity, to be passed through the outlet opening and eventually through the grinding mechanism 1.

As can be appreciated from the section view of FIG. 1, grinder assembly 100 comprises a straight discharge conduit extending from the feed funnel 26 to the grinding mechanism 1, which does not have any deviations or additional transport apparatuses, thereby reducing the amount of coffee grounds that remain in the grinder assembly 100.

Figure 2:
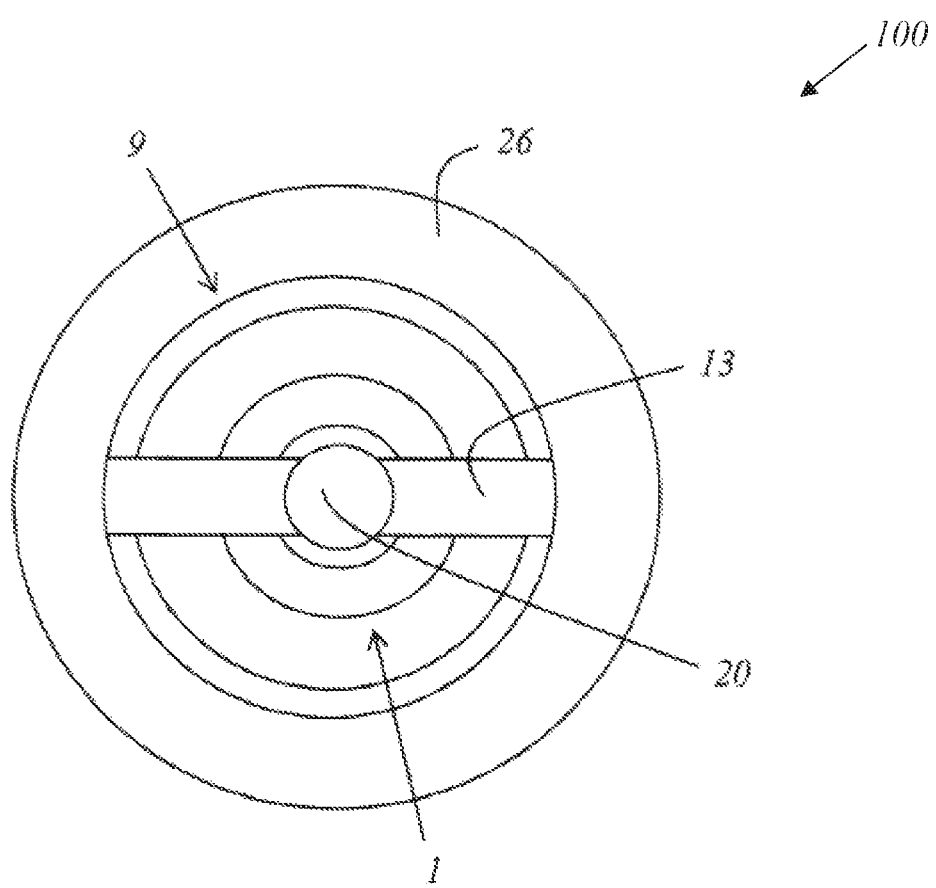
FIG. 2 is a top view of a grinder assembly in accordance with one embodiment of the present invention.

FIG. 2 shows a schematic top view on the coffee grinder shown in FIG. 1. In particular, FIG. 2 shows the feed funnel 26, which facilitates the filling process of coffee beans through the filling aperture 9 into the interior of the sleeve 7. In addition, FIG. 2 shows the first cross bar 13, on which the adjusting cap 20 is supported.

Figure 3:
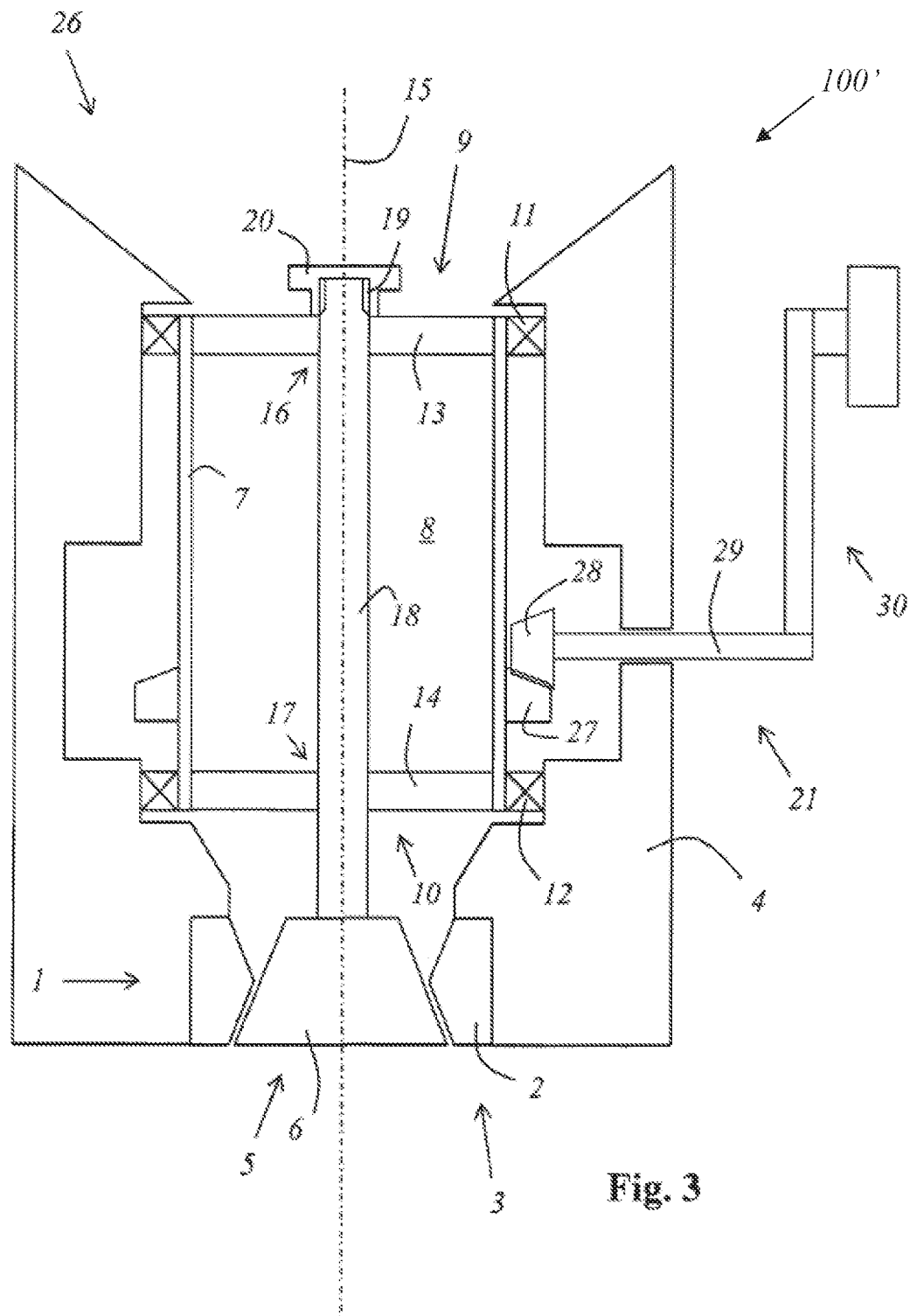
FIG. 3 is a side section view of a grinder assembly in accordance with another embodiment of the present invention.

FIG. 3 shows a diagram of another embodiment according to the present invention, which has a manually operating drive system 21'. In this embodiment, a first gear 27, which is designed in the form of a bevel gear, is arranged along the outer circumference of the sleeve 7. It will be appreciated that the first gear 27 may be either a ring gear disposed circumferentially about the sleeve 7 or a plurality of gear teeth disposed about the sleeve. The gear tooth system of the first gear 27 meshes with the gear tooth system of a second gear 28, which is also designed in the form of a bevel gear. The second gear 28 is driven by a drive shaft 29, to which a crank handle 30 is mounted, which can be detached in a non-destructive manner and without using tools. The rotational movement of the crank handle 30 is then translated to the sleeve 7, and grinding mechanism rotor 5. It will be appreciated that an alternative embodiment may comprise a crank handle 30 disposed to directly drive the shaft 18, rather than drive the sleeve 7. In such an embodiment, the crank handle 30 would be disposed substantially horizontally, causing a substantially horizontal rotation of the crank handle 30. Such a horizontal rotation would produce lateral forces on the grinder assembly 100' such that a substantially large and/or heavy base may be desirable in order to keep the grinder assembly 100' stable during grinding.

As can be seen, aside from the drive mechanism 21' and related components, the design of the grinder assembly depicted in FIG. 3 is substantially similar to that depicted in FIG. 1.

Figure 4:
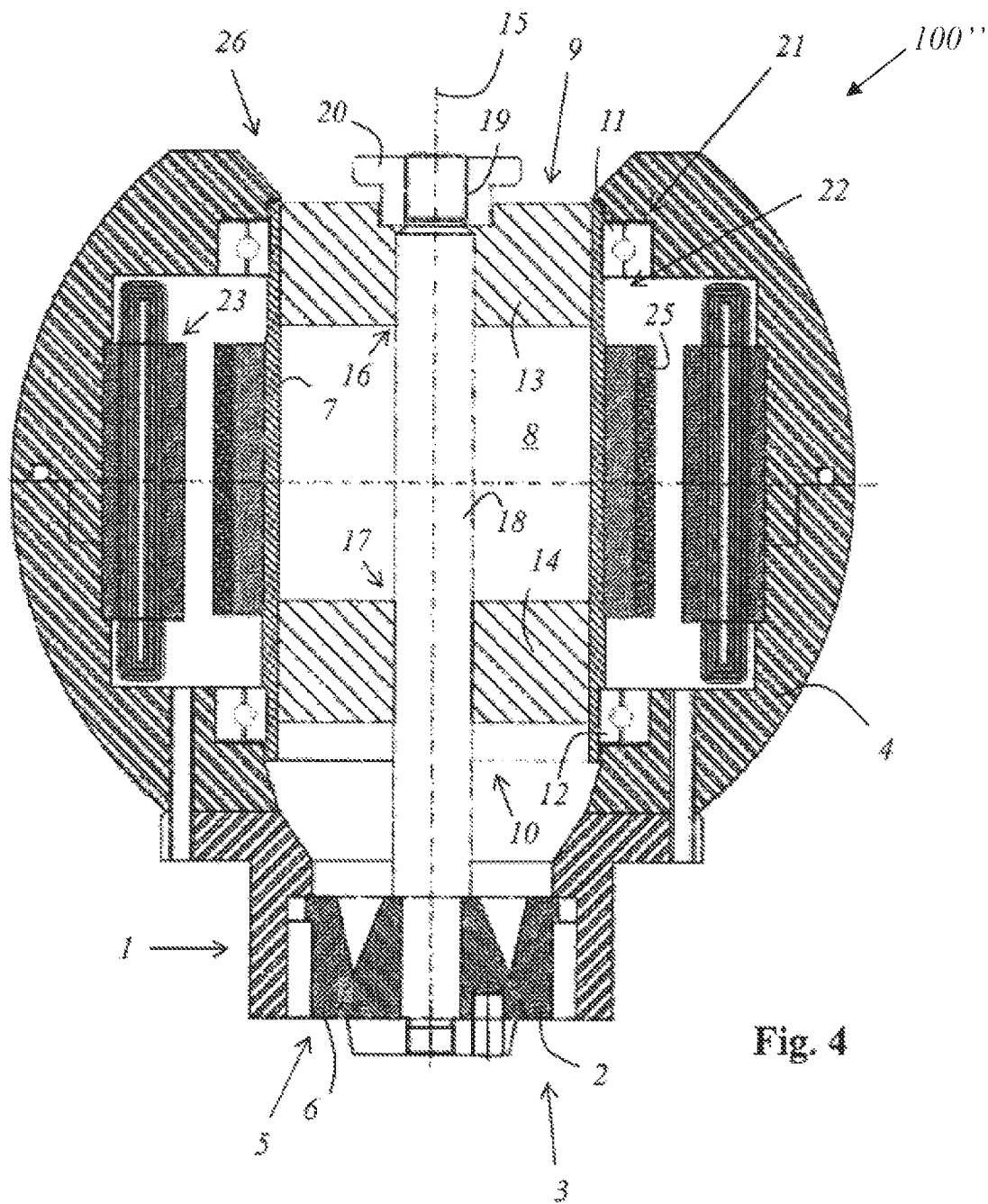
FIG. 4 is a side section view of a grinder assembly in accordance with another embodiment of the present invention.

FIG. 4 shows a third embodiment of grinder assembly 100" according to the present invention. The third embodiment of an inventive coffee grinder shown in FIG. 4 has a particularly design. Apart from the upper end, which is designed in the form of a funnel 26 for filling in the coffee beans, and apart from its mounting bracket for the grinding mechanism 1, the housing has a substantially spherical shape. Otherwise, the principal operating mode corresponds to the embodiments shown in FIGS. 1 and 2.

Figure 5:
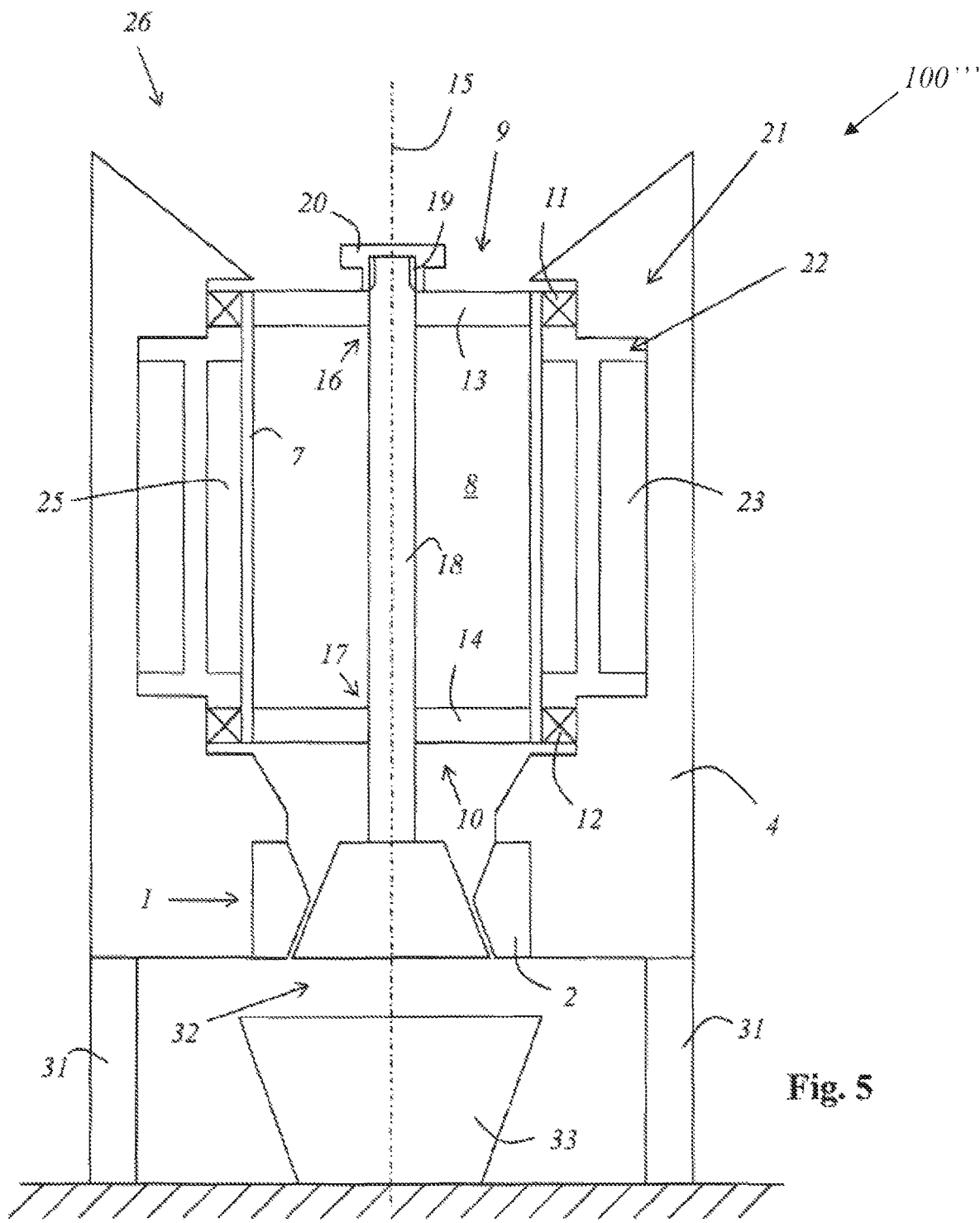
FIG. 5 is a side section view of a grinder assembly in accordance with another embodiment of the present invention.

FIG. 5 shows a fourth embodiment of a grinder assembly 100''' according to the present invention. The depicted embodiment is designed to be placed on a horizontal surface, for example, a table or a work surface during the grinding process. For this purpose, the grinder assembly 100''' comprises a plurality of feet 31, which are arranged in such a way that between the outlet end 32 for the ground coffee powder and the surface on which the grinder assembly 100''' is placed, there remains a clearance for putting a collecting vessel 33.

Figure 6:
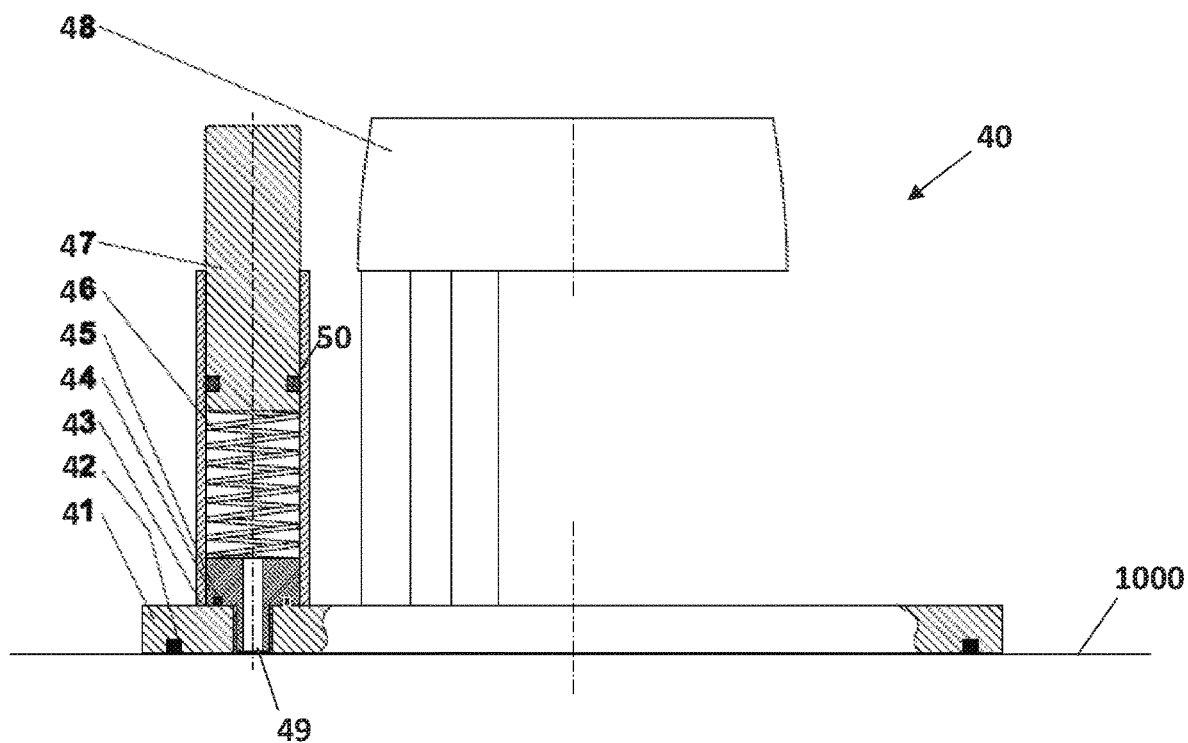
FIG. 6 is a side section view of a vacuum base plate which may be deployed with the grinder assembly of the present invention.

FIG. 6 depicts a vacuum-stabilized base 40 for the present invention, according to virtually any one of its embodiments. Though, it will be appreciated that the substantial lateral and/or vertical loads developed by a manually operated drive mechanism will be especially suited to the additional stabilization provided by the base 40. As can be seen, the base includes a base plate 41 and a gasket 42 which facilitates a substantially air-tight seal between the base plate 41 and the surface 1000 that the base plate is disposed on. Additionally, a cylinder 43 is provided in fluid communication with the other side of the base plate 41. Within the cylinder 3, a plug 44 having and aperture 49 is disposed. Above the plug rests a biasing element 46 such as a spring, and above the spring rests a piston 47 having a gasket 50.

When a user depresses the piston 47, air is forced through the aperture 49 to the other side of the base plate 41. In turn, air is then forced out between the base plate gasket 42 and the surface 1000. The biasing element 46 is disposed to bias the cylinder 43 away from the aperture 49. In doing so, the returning cylinder 43 will draw air from the other side of the base plate 41, through the aperture 49 and into the cylinder 43, thereby creating a vacuum between the base plate 41 and the surface 1000. The grinder assembly 1000 may then be disposed within the grinder assembly support 48. As may be appreciated, the vacuum stabilized base 40 serves to support and stabilize the grinder assembly 1000 during the grinding process, and especially in embodiments where a manual drive mechanism is utilized, as the rotation of the crank handle can provide substantial lateral and/or vertical loads to the grinder assembly 1000 which would need to be supported by a user in the absence of such a base 40.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A grinder assembly comprising:
   a receiving chamber and an outlet aperture disposed above a grinding mechanism, said grinding mechanism comprising at least a grinding mechanism rotor and a grinding mechanism stator;
   a drive system disposed in driving relation to said grinding mechanism;
   an outlet end disposed immediately below said grinding mechanism;
   a sleeve rotationally mounted within a housing, said sleeve at least partially enclosing said receiving chamber; and
   said drive system disposed in non-interfering relation to grounds passing through either of said outlet aperture or said outlet end.

2. The grinder assembly as recited in claim 1 wherein said grinding mechanism rotor is driven by said sleeve.

3. The grinder assembly as recited in claim 1 wherein said grinding mechanism rotor is driven by a shaft disposed within said receiving chamber.

4. The grinder assembly as recited in claim 1 wherein said sleeve comprises a rotor of an electric drive motor, and said housing comprises a stator of said electric drive motor.

5. The grinder assembly as recited in claim 4 wherein said sleeve further comprises a plurality of permanent magnets disposed about said sleeve.

6. The grinder assembly as recited in claim 4 wherein rotation of said sleeve causes rotation of said shaft, and rotation of said shaft causes rotation of said grinding mechanism rotor.

7. The grinder assembly as recited in claim 1 wherein said sleeve further comprises at least a first gear disposed about a periphery of said sleeve; the grinder assembly further comprising a crank handle disposed in driving relation to said first gear.

8. The grinder assembly as recited in claim 1 further comprising a vacuum-stabilized base, said vacuum-stabilized base comprising at least a base plate and a gasket.

9. The grinder assembly as recited in claim 1, wherein said sleeve further comprises a cylindrical shape.

* * * * *